United States Patent
Kosky et al.

Patent Number: 5,716,589
Date of Patent: Feb. 10, 1998

[54] METHOD FOR MAKING REACTION PRODUCTS OF PHOSPHORUS PENTACHLORIDE AND AMMONIUM CHLORIDE

[75] Inventors: Philip George Kosky, Niskayuna; Frank Steven Burkus II; James Anthony Cella, both of Clifton Park; Slawomir Rubinsztajn; Senya Marie Hiscox, both of Schenectady, all of N.Y.

[73] Assignee: General Electric Company, Schenectady, N.Y.

[21] Appl. No.: 630,801

[22] Filed: Apr. 10, 1996

[51] Int. Cl.$^6$ .................................................. C01B 25/10
[52] U.S. Cl. ................................................... 423/300
[58] Field of Search ..................................... 423/300

[56] References Cited

U.S. PATENT DOCUMENTS

| | | | |
|---|---|---|---|
| 3,372,005 | 3/1968 | Jaszka et al. | 423/300 |
| 4,256,715 | 3/1981 | Kinoshita et al. | 423/300 |
| 4,567,028 | 1/1986 | Tanino et al. | 423/300 |
| 4,627,967 | 12/1986 | Klobucar | 423/300 |
| 5,403,909 | 4/1995 | Rubinsztajn | 423/300 |

*Primary Examiner*—Wayne Langel
*Attorney, Agent, or Firm*—Vinit G. Kathardekar; William H. Pittman

[57] ABSTRACT

The reaction of phosphorus pentachloride with ammonium chloride is conducted in the presence of a metal-containing catalyst and carbon dioxide, preferably supercritical carbon dioxide, as a solvent. The product is generally superior in catalytic action for the polycondensation and rearrangement of organosiloxanes to conventional linear phosphonitrilic chlorides.

5 Claims, No Drawings

METHOD FOR MAKING REACTION PRODUCTS OF PHOSPHORUS PENTACHLORIDE AND AMMONIUM CHLORIDE

BACKGROUND OF THE INVENTION

The present invention relates to a method for making reaction products of phosphorus pentachloride and ammonium chloride, such as linear phosphonitrilic chloride (LPNC).

Silicone materials, such as fluids and gums, have been made by the use of catalysts to effect the condensation and/or equilibration (redistribution) of silanol-containing organosiloxanes and diorganosiloxane cyclics. These reactions can be effected by using a strong base or strong acid. Although valuable results have been achieved by using such procedures, the resulting high molecular weight polydiorganosiloxanes often have to be stripped of undesirable oligomeric cyclic species resulting from adverse equilibration circumstances.

Linear phosphonitrilic halides, especially the chlorides (LPNC) having the formula (I) $[Cl_3P(NPCl_2)_nNPCl_3]+[PCl_6]-$, where n is 0–4, also have been used as organopolysiloxane equilibration and redistribution catalysts. They may be prepared by the reaction of phosphorus pentachloride with ammonium chloride. LPNC preparation and use to effect condensation and/or equilibration of silanol fluids is shown in U.S. Pat. Nos. 2,990,419 and 3,839,388. U.S. Pat. No. 5,008,229 is directed to solutions of LPNC's in organic solvents and their use to accelerate the condensation and/or equilibration of hydroxyl-endblocked diorganosiloxanes. An advantage of the use of LPNC's is minimization of cyclics formation.

An organic solvent has typically been required to facilitate the preparation of the LPNC. Although 1,1,2,2-tetrachloroethane has been found highly effective as a solvent for LPNC, it is highly toxic. Other organic solvents, such as ethyl acetate, are environmentally unattractive.

German patent application 3,725,377 is directed to a procedure which eliminates the use of an organic solvent, by employing as the catalyst a reaction product of a phosphorus nitrogen chloride and a diorganosiloxane cyclic, such as octamethylcyclotrasiloxane. However, experience has shown that phosphorus nitrogen chloride-octamethylcyclotrasiloxane reaction products can, with the passage of time, develop viscosities of several hundred thousand centipoise, which can interfere with the use of such materials as silicone polymerization catalysts. As a result, additional procedures are being evaluated to provide silicone equilibration catalysts in an economic and environmentally approved manner.

SUMMARY OF THE INVENTION

The present invention is based on the discovery that supercritical carbon dioxide, an environmentally acceptable material, can be substituted for the organic solvent normally used to facilitate reaction between phosphorus pentachloride and ammonium chloride. Surprisingly, certain of the phosphorus pentachloride and ammonium chloride reaction products have been found to be superior as catalysts to the LPNC materials of the prior art. For example, in a polycondensation and rearrangement catalyst study at the 20 ppm level, using 10 mL of a silanol-terminated polymethylsiloxane oil (Mn=2000) as a condensation medium, the products of the invention were found to be more than three times as reactive as the LPNC catalyst.

One aspect of the invention is a method for making a phosphorus-nitrogen product which comprises effecting reaction under substantially anhydrous conditions, at a temperature above 110° and below the decomposition temperature of any reactants or product and in the presence of an effective amount of a metal-containing catalyst, between phosphorus pentachloride and ammonium chloride in a molar ratio in the range of about 1.5–5.0:1, in the presence of an amount of carbon dioxide sufficient to maintain a reaction pressure of about 80–350 atm. Another aspect is a phosphorus-nitrogen product prepared by said method.

By reason of the unexpected catalytic activity of the products prepared by the method of the invention, still another aspect is a method for condensing or equilibrating an organosilicon material comprising contacting said organosilicon material under reaction-promoting conditions, typically at a temperature in the range of about 30°–140° C., with an amount of the product of the above-described method sufficient to condense, rearrange or redistribute said organosilicon material.

DETAILED DESCRIPTION; PREFERRED EMBODIMENTS

The method of this invention typically employs supercritical carbon dioxide. That is, the $CO_2$ behaves as a solvent during the reaction between phosphorus pentachloride and ammonium chloride; the reaction is conducted under sealed conditions. Reaction temperatures are above 110° and below the decomposition temperatures of reactants or product, most often below 140° C. Pressures are in the range of about 80–350 and preferably about 130–350 atm.

A metal-containing catalyst is required. It is preferably a transition metal compound such as a salt of iron, tin, molybdenum, nickel or chromium. It may be present in catalytic amounts, the magnitude of which can be determined by simple experimentation.

The necessity for a catalyst has been determined via a parallel preparation reaction in an organic solvent in the presence of ferrous chloride, under which conditions a material effective as a catalyst for silanol condensation is produced. Similarly, if the reaction is conducted in a metal (e.g., stainless steel) vessel or in a non-metallic vessel having a metallic stirring apparatus, the small proportion of metal salt formed by reaction of phosphorus pentachloride with the wall of said vessel may be sufficient to catalyze the reaction.

The reaction in supercritical carbon dioxide does not afford a catalytically active product when conducted in a polytetrafluoroethylene-lined vessel in the absence of metals. However, a catalytically active product is obtained if a small amount of ferric chloride is present in a glass ampule which is broken under the stirring and pressure conditions in said vessel.

The reaction conditions are sufficient to maintain the $CO_2$ at a density at which it acts as a solvent for the reaction mixture. During product generation under isothermal conditions, it has been found that an overall build-up in reaction pressure, which achieves a maximum before leveling off, can result.

In the practice of the invention, a mixture of phosphorus pentachloride (usually powdered) and ammonium chloride is typically introduced under substantially anhydrous conditions into a high pressure reactor, such as an autoclave.

Preferably, the reagent mixture has been previously finely ground in a dry, inert atmosphere such as nitrogen.

Carbon dioxide then can be introduced into the reactor. However, the order of addition of powdered reagents and $CO_2$ is not critical. A convenient procedure is to introduce the $CO_2$ as a liquid in measured small containers which can be previously refrigerated. Based on such factors as the size of the reactor and the amount of reactants charged to the reactor, the amount of $CO_2$ used can vary widely.

Reaction time can vary from about 0.5 hour to about 3 hours depending upon such factors as the reaction conditions and size of the reactor used. At the termination of the reaction between phosphorus pentachloride and ammonium chloride, which is shown by the isothermal achievement of a substantially constant total pressure of $CO_2$ and HCl, the reactor can be allowed to cool to ambient temperature.

The reactor can then be vented of gaseous materials which can be led through a suitable organic solvent such as methylene chloride to dissolve any volatile organic or inorganic materials. The treated gases can then be scrubbed further for any acidic by-products by passage through a basic solution such as aqueous caustic soda containing triethylamine.

The product can then be recovered under ambient conditions. It is frequently found to have a higher activity than that of a conventional LPNC in organosiloxane condensation and equilibration reactions.

It has been found that in certain instances, the activity of the product can be enhanced and its convenience of use improved if the crude reactor solids are extracted with an organic solvent while maintaining substantially anhydrous conditions. Suitable organic solvents include methylene chloride, which can be used in combination with a precipitating solvent, typically an aliphatic hydrocarbon such as hexane.

The expression "silanol-containing organosiloxane" as used herein includes polydiorganosiloxane fluids having the formula (II) $HO-[Si(R^1)_2-O]_xH$ and mixtures thereof with silanol fluids of the formula, (III) $R^2[(R^1)_2SiO]_yH$, where $R^1$ is a $C_{1-13}$ organic group, $R^2$ is hydrogen or $R^1$ and x and y are integers having a value of about 5–10,000 and preferably about 20–1,000. These fluids can have a viscosity in the range of about 5–500,000 and preferably about 10–30,000 centipoise. They can optionally also contain Si-H and/or Si-vinyl groups.

The fluids of formula II can be made by hydrolyzing a diorganosilane such as dimethyldichlorosilane in a controlled amount of water in the presence of a suitable acid or base catalyst. Those of formula III can be made by equilibrating organosiloxanes comprising a mixture of triorganosiloxy and diorganosiloxy units, and can contain about 0.02–8% hydroxy radicals attached to silicon. Methods for making such silanol fluids are disclosed in U.S. Pat. No. 3,541,044, incorporated herein by reference.

In the condensation of silanol-containing organosiloxanes according to the invention, a mixture of said silanol-containing organosiloxane and the phosphorus-nitrogen product, the latter typically in the amount of about 5–500 ppm by weight, is agitated, such as by stirring, typically at a temperature in the range of 30°–140° C. While pressures up to about 350 torr have been found effective for the production of silicone oils, it is preferred to employ a pressure of 0.01–100 and still more preferably 0.01–5.0 torr when the production of silicone gums is desired.

Silanol condensation and organosiloxane polymerization can be facilitated by effecting the rapid removal of water of reaction from the reaction mixture. Batch or continuous procedures can be used to provide a variety of silicone products, such as silicone gums, fluids and resins.

Equilibration (redistribution) of polyorganosiloxanes, typically free from silanol groups but optionally containing Si-H and/or Si-vinyl groups, may be achieved by heating to polyorganosiloxane with a similar catalytic amount of the phosphorus-nitrogen product at a temperature in the range of about 30–150 and preferably 50°–140° C. As the reaction proceeds, lower molecular weight polyorganosiloxanes are formed.

The invention is illustrated by the following examples. All parts are by weight unless otherwise designated.

EXAMPLES 1–2

A series of reactions was conducted under substantially anhydrous conditions in the presence of carbon dioxide in a 300-mL glass-lined autoclave having a metal stirring apparatus. There were introduced into the autoclave 2:1 molar mixtures of phosphorus pentachloride and ammonium chloride which had been powdered in a dry nitrogen atmosphere. The reactions were conducted at pressures in the range of 85–228 atm, at a temperature of 120° C. and over a time period of about 90 minutes. Dried liquid carbon dioxide was added from one or more 40-mL sample bombs. The bombs were cooled in dry ice, allowed to fill with carbon dioxide and weighed. By using isolation valves and regulating the bomb temperature, a controlled weight of carbon dioxide was delivered to the reactor. The details of illustrative reactions are given in the following table.

|  | Example | |
| --- | --- | --- |
|  | 1 | 2 |
| Pressure, atm | 228 | 167 |
| $PCl_5$, g | 51 | 78 |
| $NH_4Cl$, g | 6.5 | 10 |
| $CO_2$, g | 176 | 90 |

At the termination of the reactions, the autoclave was cooled to room temperature and vented through methylene chloride to dissolve volatile by-products. The gases were then passed through a caustic soda solution containing triethylamine to capture any acidic by-products.

Brown-yellow solids were recovered from the reaction mixtures. If desired, the recovered solids could be purified by dissolving in methylene chloride and precipitating by addition of hexane. The untreated solids had $^{31}P$ NMR spectra different from those of the light yellow crystals of LPNC of formula I.

EXAMPLE 3

The activity of a product of the type prepared in Examples 1–2 was compared with that of a conventional LPNC at the 20 ppm level. In the 20 ppm study, the condensation kinetics of 10 mL of a Tosil® hydroxy-endstopped polydimethylsiloxane fluid (Mn=2000) was studied at 120° C. In terms of kinetic measurements, it took the products of the invention 20 seconds to reach the unreadable "gum" level, while the product from the conventional LPNC required 1 minute.

A product similarly prepared in a fluoropolymer-lined autoclave was inactive under the same conditions, confirming the necessity of a metal-containing catalyst to produce an active species.

EXAMPLE 4

A trimethylsiloxy-endstopped polydimethylsiloxane fluid having 200 ppm silanol was contacted with 40 ppm of a product of the type prepared in Examples 1–2, at a temperature of about 100° C., a pressure of 2 torr and a 3.3-minute residence time. The product silanol level was only 11 ppm. A conventional LPNC resulted in a product silanol level as high as 17 ppm.

Based upon the above results, the products of the present invention can be used as substitutes for conventional LPNC compounds in the manufacture of silicone gums and oils, including products containing silicon hydride moieties, from lower molecular weight silanol group-containing organosilicon materials.

EXAMPLE 5

Trimethylsiloxy-endstopped polydimethylsiloxane with a degree of polymerization of 6, 1.07 g, was combined with 0.16 g of dodecane as an internal standard. The mixture was heated to 80° C. and 12 microliters of a solution of a product of the type prepared in Examples 1–2 was added. After 15 minutes of heating, the polydimethylsiloxane had been redistributed into silicones of other molecular weights. Similar treatment with a conventional LPNC resulted in a much slower reaction.

What is claimed is:

1. A method for making a phosphorus-nitrogen product which comprises effecting reaction under substantially anhydrous conditions, at a temperature above 110° and below the decomposition temperature of any reactants or product and in the presence of an effective amount of a metal-containing catalyst, between phosphorus pentachloride and ammonium chloride in a molar ratio in the range of about 1.5–5.0:1, in the presence of an amount of carbon dioxide sufficient to maintain a reaction pressure of about 80–350 atm.

2. A method for making a phosphorus-nitrogen product which comprises:

effecting reaction under substantially anhydrous conditions, in a reactor at a temperature above 110° and below the decomposition temperature of any reactants or product and in the presence of an effective amount of a catalytic amount of a transition metal compound, between phosphorus pentachloride and ammonium chloride in a molar ratio in the range of about 1.5–5.0:1, in the presence of an amount of carbon dioxide sufficient to maintain a reaction pressure of about 130–350 atm;

venting the reactor of gaseous materials which are passed through a basic solution; and recovering reaction solids from the reactor under ambient conditions.

3. A method in accordance with claim 1 where the reaction temperature is up to 140° C.

4. A method in accordance with claim 2 where the reaction solids are extracted with an organic solvent.

5. A method in accordance with claim 4 where the organic solvent is methylene chloride.

* * * * *